Aug. 24, 1965
G. A. HEBERT ETAL
3,201,983
DYNAMICALLY COMPENSATED FORCE MEASURING APPARATUS
Filed Sept. 5, 1961
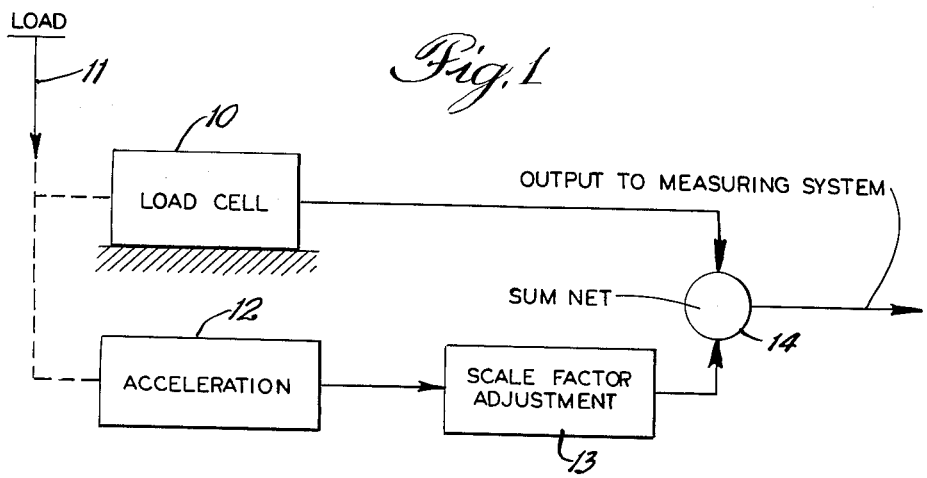
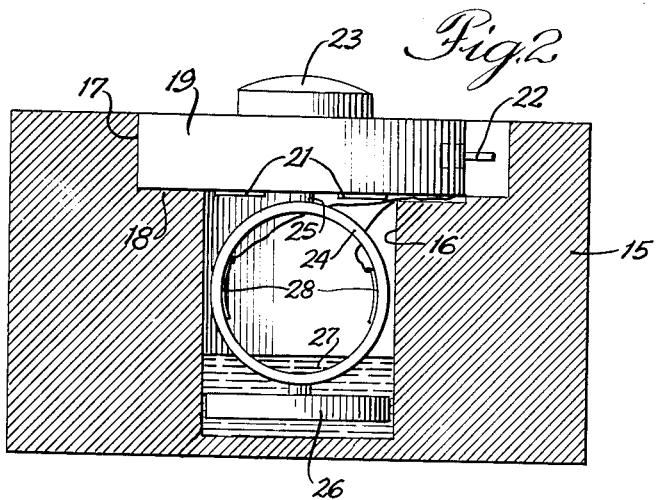
INVENTORS:
Gerald A. Hebert
and Robert T. Brumbaugh,
BY Brix Freeman & Molinare
ATTORNEYS.

3,201,983
DYNAMICALLY COMPENSATED FORCE MEASURING APPARATUS
Gerald A. Hebert, Chicago, and Robert T. Brumbaugh, Evanston, Ill., assignors, by mesne assignments, to Goodman Manufacturing Company, Chicago, Ill., a corporation of Illinois
Filed Sept. 5, 1961, Ser. No. 136,096
3 Claims. (Cl. 73—141)

This invention relates to force measuring apparatus and more particularly to the measurement of the static value of forces including both static and dynamic components. Measurement of forces involving steady state or static values and dynamic components, such as vibration forces, has heretofore been an extremely difficult problem. One area in which this problem has been particularly acute is in connection with weighing of loads in motion, such as weighing of railway cars while rolling over a track scale or trucks or trailers while moving over a scale. Heretofore it has been necessary to provide long scales and relatively low speeds to enable the shocks incident to movement of the load onto the scale to be dissipated and for the scale to settle down to an average steady condition before the measurement can be made. This is never desirable and is frequently not even possible.

It is accordingly an object of the present invention to provide a force measuring apparatus in which dynamic components of the force are automatically cancelled out to leave only static components to be indicated or recorded.

Another object is to provide a force measuring apparatus in which two transducers are employed, one of which is yieldingly supported on a dash pot, or the like, to respond only to dynamic components of the force and whose signal is subtracted from that of the other transducer to leave in the resulting signal only the static components.

According to a feature of the invention, the transducers are in the form of electric load cells, one of which produces a voltage proportional to the total force and the other of which produces a voltage responsive to the dynamic components only of the force with the last named voltage being subtracted from the first named voltage to leave a value proportional to the static components only of the force.

A further object of the invention is to provide a combined load cell incorporating one portion responsive to the total load and a second portion responsive only to dynamic components of the load.

According to a feature of the invention, the electric load cell includes a deflectable disc to which strain gauges are attached for measuring total force and a second deflectable element connected to the disc and to a dash pot to deflect only in response to dynamic components of the force.

The above and other objects and features of the invention will be more readily apparent from the following description when read in connection with the accompanying drawing, in which:

FIGURE 1 is a diagrammatic view of a force measuring system embodying the invention; and FIGURE 2 is a sectional view of a composite load cell according to the invention.

The complete system, as illustrated diagrammatically in FIGURE 1, comprises a transducer 10, such as an electric load cell, to which a total load, as indicated diagrammatically at 11, is applied. A second transducer 12 responsive only to dynamic components of the load, such as acceleration components, is also subjected to the load, but will produce an output proportional only to the dynamic components of the load.

The output of the transducer 12 may be supplied to a scale factor adjustment unit 13 which in the case of an electrical system could be a simple adjustable rheostat or potentiometer to vary the proportion of the signal supplied by the transducer 12 which will be employed. The output of the scale adjustment factor unit 13 and of the first transducer 10 are supplied to a summation network 14 in which they are combined so that the output of the scale factor adjustment unit is subtracted from the output of the total transducer 10. This will leave an output to a measuring or recording system which is proportional only to the static components of the load.

The two transducers 10 and 12 may be combined in a single load cell unit, as shown in FIGURE 2, for use in weighing or other force measuring applications. The load cell, as illustrated, comprises a body 15 made of high grade steel, or similar material, and with a cylindrical recess 16 opening at its top and extending partially therethrough. Above the recess 16 an enlarged recess 17 is provided joined to the recess 16 by a flat annular shoulder 18. A disc 19 formed of high grade steel, or similar material, fits into the recess 17 with its peripheral edge portion resting on the shoulder 18 completely around its periphery. Strain gauges 21 are secured to the lower surface of the disc 19 between its central portion and its periphery and may be connected to output terminals 22 extending into a cavity in the load cell body at one side of the disc 19. Suitable connections to the terminals 22 may be made after which the cavity may be filled with a sealing material to seal the disc and the electrical connections from contamination. The construction as so far described is essentially the same as that more particularly disclosed and claimed in the co-pending application of Hebert, Serial No. 52,717, filed August 29, 1960, now Patent No. 3,101,464, and functions in the same manner to produce an electric voltage proportional to the total load applied to the disc through a central load button 23.

In the present construction, the recess is made substantially deeper than in the construction shown in the Hebert application referred to above to receive a second strain responsive unit. While this second unit could be similar to the disc 19, it is shown as an annular ring 24 positioned with its axis horizontal so that the ring lies in a generally vertical plane. At its upper peripheral portion, the ring is connected through a short rod or connector 25 to the central portion of the disc 19. At its lower portion diametrically opposite to the connector 25, the ring is connected to a piston 26 which fits loosely in the recess 16 and which is submerged in oil or similar material illustrated at 27 to define with the recess a liquid dash pot. It will be understood that the oil 27 could be a relatively thin oil or, if preferred, could be a fairly thick, greasy material, depending upon the dash pot characteristics desired. These characteristics may also be varied by adjusting the clearance between the periphery of the piston 26 and the inner surface of the recess 16.

The ring 24 carries at its opposite sides electric strain gauges 28 similar to the strain gauges 21 and which may also be wired to the terminals 22 for connection to an outside measuring or recording device.

In using the load cell, as shown in FIGURE 2, as, for example, in a motion weighing application a scale over which the load is moved will be supported by the buttons 23 of one or more load cells of the type illustrated. When a load travels across the scale platform the discs 19 of the load cells will be deflected proportionately to the load applied thereto including not only the static components, but also the dynamic components of the load. The output of the strain gauges 21 will therefore be a voltage varying proportionately to all of the components of the load, including bouncing, vibration, and the like.

At the same time, the upper portion of the ring 24 connected to the connector 25 will move with the central portion of the disc 19. However, since the lower portion of the ring is yieldingly supported by the dash pot piston 26, the signal produced by the strain gauges 28 will be proportional only to acceleration components of the load. Since the piston can move with deflection of the disc 19 any steady state components of the load will not cause deflection of the ring 24 and will not be reflected in the signal produced by the strain gauges 28.

The signals produced by the strain gauges 21 and 28, respectively, may be combined in any desired summation network, such as a conventional bridge circuit, wherein the dynamic or acceleration signal produced by the strain gauges will be subtracted from the total signal, including both the dynamic and static components of the load produced by the strain gauges 21. Output of this summation network will therefore be a signal proportional to the static components only of the load or applied force. In this way, the effects of shock, bouncing and vibration can be cancelled out from the signal without requiring the load to be on the scale platform for a long period of time so that a moving load may be weighed quickly and accurately.

The principles of the invention and the apparatus, as illustrated, are, of course, applicable to the instrument of other forces involving both static and dynamic components, such as vibration or the like. It is therefore not intended that the invention should be limited to weighing of load in motion or otherwise than by the terms of the appended claims.

What is claimed is:

1. In apparatus for measuring a force, a load cell comprising a base, a first deflectable element mounted on said base, said force being applied to a portion of said first deflectable element, said first deflectable element being deflectable proportionally to said force, a first strain gauge secured to said first element and to be variably strained proportionally to the deflection of said first element, a second deflectable element secured to said first deflectable element in substantial alignment with said portion of said first element to which said force is applied, a second strain gauge secured to said second deflectable element and being variably strained proportionally to the deflection thereof, yielding means supporting said second deflectable element in said base whereby said second deflectable element is deflected proportionally to dynamic portions only of said force while said first deflectable element is deflected proportionally to both dynamic and static components of said force, and means to subtract the signal produced by said second strain gauge from the signal produced by said first strain gauge to provide for a determination of the static components only of said force.

2. In apparatus for measuring a force, a load cell comprising a base having a central recess therein, a deflectable disc supported on the base spanning the recess to receive the force in its central portion and to deflect in response thereto, strain gauges secured to the disc to be strained proportionally to deflection of the disc, a second deflectable element in the recess connected to the central portion of the disc, second strain gauges secured to the second deflectable element to be strained proportionally to deflection thereof, dash pot means supporting the second deflectable element in the base whereby it will be deflected proportionally to dynamic components only of the force and means to subtract the signal produced by the second strain gauges from the signal produced by the first named strain gauges.

3. In apparatus for measuring a force, a load cell comprising a base having a central recess therein, a deflectable disc supported on the base spanning the recess to receive the force in its central portion and to deflect in response thereto, strain gauges secured to the disc to be strained proportionally to deflection of the disc, an annular ring perpendicular to the disc and secured at one side to the central portion thereof, second strain gauges secured to the ring, a piston secured to the other side of the ring and fitting loosely in the recess to define therewith a fluid dash pot and means to subtract the signal produced by the second strain gauges from the signal produced by the first named strain gauges.

References Cited by the Examiner

UNITED STATES PATENTS

| | | |
|---|---|---|
| 2,359,245 | 9/44 | Ritzmann. |
| 2,767,974 | 10/56 | Ballard et al. _____ 73—88.5 X |
| 2,885,891 | 5/59 | Wilson et al. _____ 73—88.5 X |
| 3,105,564 | 10/63 | Ormond _____ 73—88.5 X |

RICHARD C. QUEISSER, *Primary Examiner.*

ROBERT L. EVANS, JOSEPH P. STRIZAK, *Examiners.*